(12) United States Patent
Ceylan et al.

(10) Patent No.: US 10,861,232 B2
(45) Date of Patent: Dec. 8, 2020

(54) GENERATING A CUSTOMIZED THREE-DIMENSIONAL MESH FROM A SCANNED OBJECT

(71) Applicant: Adobe Inc., San Jose, CA (US)

(72) Inventors: Duygu Ceylan, Mountain View, CA (US); Daichi Ito, Los Gatos, CA (US)

(73) Assignee: ADOBE INC., San Jose, CA (US)

(*) Notice: Subject to any disclaimer, the term of this patent is extended or adjusted under 35 U.S.C. 154(b) by 0 days.

(21) Appl. No.: 16/862,301

(22) Filed: Apr. 29, 2020

(65) Prior Publication Data

US 2020/0258301 A1 Aug. 13, 2020

Related U.S. Application Data

(63) Continuation of application No. 15/423,348, filed on Feb. 2, 2017, now Pat. No. 10,679,408.

(51) Int. Cl.
| | |
|---|---|
| *G06T 17/20* | (2006.01) |
| *G06T 15/04* | (2011.01) |
| *G06T 3/00* | (2006.01) |
| *G06T 1/00* | (2006.01) |
| *G06T 7/13* | (2017.01) |
| *G06T 7/90* | (2017.01) |

(52) U.S. Cl.
CPC ............ *G06T 17/20* (2013.01); *G06T 1/0007* (2013.01); *G06T 3/0031* (2013.01); *G06T 7/13* (2017.01); *G06T 7/90* (2017.01); *G06T 15/04* (2013.01); *G06T 2200/08* (2013.01); *G06T 2207/10008* (2013.01); *G06T 2207/20212* (2013.01)

(58) Field of Classification Search
None
See application file for complete search history.

(56) References Cited

U.S. PATENT DOCUMENTS

| | | | |
|---|---|---|---|
| 7,065,242 B2* | 6/2006 | Petrov | G06K 9/20 345/420 |
| 8,259,069 B1 | 9/2012 | Trisnadi et al. | |
| 9,196,089 B2* | 11/2015 | Tena | G06T 17/205 |
| 9,311,746 B2* | 4/2016 | Gravois | G06T 19/006 |

(Continued)

OTHER PUBLICATIONS

Art and Technology at Pixar, from Toy Story to today. Siggraph Asia 2015 Course Notes. Ryusuke Villemin, Christophe Hery, Sonoko Konishi, Takahito Tejima, David G Yu.

(Continued)

*Primary Examiner* — James A Thompson
(74) *Attorney, Agent, or Firm* — Keller Jolley Preece

(57) ABSTRACT

The present disclosure is directed toward systems and methods that facilitate scanning an object (e.g., a three-dimensional object) having custom mesh lines thereon and generating a three-dimensional mesh of the object. For example, a three-dimensional modeling system receives a scan of the object including depth information and a two-dimensional texture map of the object. The three-dimensional modeling system further generates an edge map for the two-dimensional texture map and modifies the edge map to generate a two-dimensional mesh including edges, vertices, and faces that correspond to the custom mesh lines on the object. Based on the two-dimensional mesh and the depth information from the scan, the three-dimensional modeling system generates a three-dimensional model of the object.

20 Claims, 8 Drawing Sheets

(56) References Cited

U.S. PATENT DOCUMENTS

| | | | |
|---|---|---|---|
| 9,691,178 B2* | 6/2017 | Iverson | G06T 19/20 |
| 9,721,385 B2 | 8/2017 | Herman | |
| 2002/0186216 A1 | 12/2002 | Baumberg et al. | |
| 2007/0223817 A1 | 9/2007 | Ulrich et al. | |
| 2008/0123958 A1 | 5/2008 | Ratner et al. | |
| 2011/0293137 A1 | 12/2011 | Gurman et al. | |
| 2013/0083021 A1 | 4/2013 | Cohen et al. | |
| 2013/0135305 A1 | 5/2013 | Bystrov et al. | |
| 2013/0307848 A1* | 11/2013 | Tena | G06T 17/205 |
| | | | 345/420 |
| 2013/0314412 A1* | 11/2013 | Gravois | G06T 19/00 |
| | | | 345/420 |
| 2013/0335416 A1* | 12/2013 | Coon | G06T 17/20 |
| | | | 345/423 |
| 2016/0110917 A1* | 4/2016 | Iverson | G06T 17/205 |
| | | | 345/420 |
| 2017/0064284 A1* | 3/2017 | Auclair | G06K 9/00214 |
| 2018/0139436 A1 | 5/2018 | Yucer et al. | |
| 2018/0218535 A1 | 8/2018 | Ceylan et al. | |
| 2020/0211255 A1* | 7/2020 | Elg | G06T 15/04 |

OTHER PUBLICATIONS

Parallel thinning with two sub-iteration algorithms. Zicheng Guo, Richard W. Hall. Communications of the ACM 1989.
U.S. Appl. No. 15/423,348, Jul. 27, 2018, Preinterview 1st OA.
U.S. Appl. No. 15/423,348, Nov. 23, 2018, Office Action.
U.S. Appl. No. 15/423,348, Apr. 2, 2019, Office Action.
U.S. Appl. No. 15/423,348, Oct. 8, 2019, Office Action.
U.S. Appl. No. 15/423,348, Jan. 31, 2020, Notice of Allowance.

* cited by examiner

GENERATING A CUSTOMIZED THREE-DIMENSIONAL MESH FROM A SCANNED OBJECT

CROSS-REFERENCE TO RELATED APPLICATIONS

The present application is a continuation of U.S. application Ser. No. 15/423,348, filed on Feb. 2, 2017. The aforementioned application is hereby incorporated by reference in its entirety.

BACKGROUND

Recent years have seen a rapid proliferation in drafting, modeling, and modifying three-dimensional models. Indeed, it is now common for individuals and businesses to generate three-dimensional models of various objects. For example, many designers, animators, and other artists utilize three-dimensional modeling software to create three-dimensional models. Modeling software further enables various artists to edit, manipulate, or otherwise interact with the three-dimensional models. Until recently, however scanning based three-dimensional modeling systems were only available to high-end professionals. As a result, three-dimensional scanning technologies have become more available to consumers and thus, more creative professionals have started scanning and modeling physical objects.

Conventional scanning based three-dimensional modeling systems, however, suffer from a variety of problems. For instance, when scanning a physical object to generate a three-dimensional model, conventional scanning based three-dimensional modeling systems often make an overwhelming number of polygons (point cloud) that make the scanned object nearly un-editable. In particular, conventional scanning based 3D modeling systems often fail to generate reasonable structure lines (e.g., edge loops) including features that correspond to surfaces, grooves, irregularities, or other features of the physical object. As a result, conventional scanning based three-dimensional modeling systems fail to generate user-friendly three-dimensional models including features that correspond to the edges of physical object (e.g., muscles of a human body, mechanical moving parts).

Some artists in the three-dimensional animation industry facilitate creation of a user-friendly three-dimensional model by drawing or sketching control guidelines over a surface of the physical object prior to scanning the physical object that assist modeling systems when generating the three-dimensional model. Generating models using hand-drawn control guidelines, however, used to involve expensive equipment that is not widely available to most artists. For example, scanning based 3D modeling systems that 3D animation industry used typically include an expensive point-tracking device and specialized scanners that digitize physical objects based on markings made on the physical object using the point-tracking device. As a result, most artists have limited or no access to tools and equipment that facilitate creation of user-friendly three-dimensional models.

Moreover, even where artists have access to expensive equipment for generating user-friendly three-dimensional models, sketching control guidelines using conventional point tracking devices and scanning equipment involves a time-consuming process that cannot be interrupted prior to completion. As a result, this type of process of scanning based three-dimensional modeling has never been popular.

SUMMARY

Embodiments of the present disclosure provide benefits and/or solve one or more of the foregoing and other problems in the art with systems and methods for generating three-dimensional models of physical objects. In particular, the disclosed systems and methods involve receiving a scan of a three-dimensional object having custom mesh lines thereon. The scan includes a two-dimensional image of the three-dimensional object and depth information about the three-dimensional object. The disclosed systems and methods generate an edge map by detecting edges within the two-dimensional image. These edges correspond to the custom mesh lines drawn on the physical object. The systems and methods further construct a three-dimensional mesh of the three-dimensional object using the edge map and the depth information. In this way, the systems and methods described herein implement an intuitive and user-friendly approach to creating a custom three-dimensional model for a three-dimensional object.

Additional features and advantages will be set forth in the description which follows, and in part will be obvious from the description, or may be learned by the practice of such exemplary embodiments.

BRIEF DESCRIPTION OF THE DRAWINGS

Various embodiments will be described and explained with additional specificity and detail through the use of the accompanying drawings in which.

DETAILED DESCRIPTION

Figure 1:
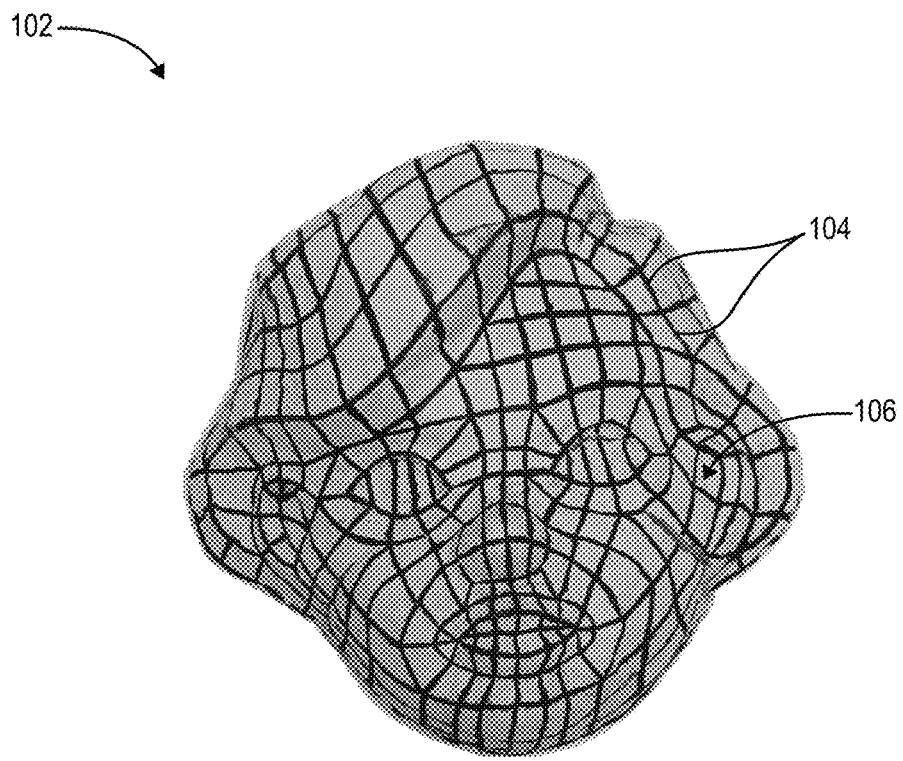
FIG. 1 illustrates an example three-dimensional object having custom mesh lines in accordance with one or more embodiments.

One or more embodiments of the present disclosure include a scanning based three-dimensional modeling system (hereinafter referred to three-dimensional modeling system) that facilitates scanning a three-dimensional object (or simply "object") and generating a customized three-dimensional mesh of the object from identified features of the scan. For example, the three-dimensional modeling system receives or otherwise obtains a scan of an object having custom mesh lines thereon. The scan includes one or more images of the object and depth information about the object. Based on information obtained from the scan of the object, the three-dimensional modeling system constructs a three-dimensional mesh of the object that includes polygons corresponding to the custom mesh lines.

As mentioned above, the three-dimensional modeling system receives a scan of an object (e.g., physical object) having custom mesh lines thereon. As used herein, a "scan" of an object refers to a scan of a three-dimensional object captured by a scanning device including a Red Blue Green (RGB) camera and an infrared (IR) camera (or other depth sensor or depth estimation technologies such as depth from stereo paired cameras, focus-based depth estimation, etc.). In one or more embodiments, the scan includes a series of images captured by the RGB camera and associated depth information captured by the IR camera. In one or more embodiments, a scan further includes a two-dimensional texture map for the three-dimensional object that includes a composite image based on a combination of the series of images and associated depth information.

In addition, as used herein, "custom mesh lines" (or simply "mesh lines") refer to straight or curved lines passing over a surface of an object. In one or more embodiments, mesh lines refer to lines drawn over the surface of the object prior to capturing a scan of the object. In one or more embodiments, the custom mesh lines provide a texture atlas or control mesh that provide a model for the three-dimensional modeling system in generating a three dimensional mesh of a three-dimensional object based on the lines drawn over a surface of the three-dimensional object. In contrast to points of guidelines digitized using expensive or specialized point-tracking devices one by one and using specialized digitization software, one or more embodiments of the many mesh lines refer to lines drawn using a simple non-electronic device such as a marker, a pen, a pencil, paintbrush, or other drawing device scanned using consumer three-dimensional camera (RGB+IR) at once. As another example, mesh lines can refer to stickers, paper, plastic, or other material placed over a surface of the three-dimensional object that has a different color than a surface of the three-dimensional object.

In one or more embodiments, the scan further includes a two-dimensional texture map of the scanned object (e.g., a two-dimensional image representing the texture of the three-dimensional object obtained by compositing RGB images of the texture map during the scanning process). For example, as will be described in further detail below, in addition to capturing images and depth information of the object, the scanning device provides scanning data that the three-dimensional modeling system uses to generate a two-dimensional texture map of the object by combining a series of multiple images based on captured depth information for the object. In one or more embodiments, a three-dimensional modeling system on a client device generates the two-dimensional texture map from a series of images of the object and the captured depth information.

Upon receiving the scan of the object, the three-dimensional modeling system can generate an edge map. In particular, in one or more embodiments, the three-dimensional modeling system analyzes the two-dimensional texture map to identify edges within the two-dimensional texture map (e.g., lines within the model corresponding to the custom mesh lines). Based on the detected edges, the three-dimensional modeling system generates an edge map that includes a visual representation of custom mesh lines. In one or more embodiments, the three-dimensional modeling system generates the edge map by generating a binary representation of the image including white pixels representative of the detected edges and black pixels representative of other portions of the image.

In addition to generating the edge map, the three-dimensional modeling system can generate a two-dimensional mesh by refining or otherwise modifying the edge map in various ways. For example, in one or more embodiments, the three-dimensional modeling system thins the detected edges of the edge map to have a uniform thickness (e.g., single-pixel thickness). In addition, in one or more embodiments, the three-dimensional modeling system replaces curved or bending lines of the edge map with straight lines between identified junctions of edges of the edge map. Moreover, in one or more embodiments, the three-dimensional modeling system combines junctions or intersections of the edges to produce polygons having a predetermined number of sides (e.g., 3 and/or 4 sides). The three-dimensional modeling system further generates a two-dimensional mesh including the modifications to the edge map.

Further, the three-dimensional modeling system can generate a three-dimensional mesh of the object based on the two-dimensional mesh and the depth information obtained from the scan of the object. In particular, the three-dimensional modeling system can generate a three-dimensional mesh including polynomials having edges and faces based on the two-dimensional mesh. In one or more embodiments, the three-dimensional modeling system generates the three-dimensional mesh by applying the two-dimensional map to a three-dimensional structure (e.g., based on the depth information) using one or more UV parameterization techniques.

As used herein, a "three-dimensional mesh" or "mesh structure" refers to a three-dimensional polygonal of elements, such as vertices, connecting edges, and/or faces defined by intersecting edges and vertices. For instance, in one or more embodiments, a mesh is defined by a plurality of vertices and edges that define elements of a predefined shape (e.g., triangular faces, rectangular faces) that make up a surface of the mesh.

In this way, the three-dimensional modeling system provides an intuitive and user-friendly process for generating a three-dimensional mesh including polynomials that have vertices, edges, and faces that correspond to physical features of a three-dimensional object. In particular, the three-dimensional modeling system provides a process for generating the three-dimensional mesh including polynomials that correspond to custom mesh drawn or otherwise placed over a surface of the three-dimensional object. Using this mesh, a user can interact with and manipulate features of a three-dimensional model that correspond to features of the three-dimensional object. Having features of the mesh that correspond to features of the three-dimensional object enable a user to more conveniently and intuitively interact with and modify (e.g., edit) a three-dimensional model of the object.

Moreover, the three-dimensional modeling system facilitates creation of the three-dimensional mesh without using specialized equipment having limited accessibility and which most users find difficult to use. For example, as mentioned above, the polynomial custom mesh lines drawn using simple non-electronic electronic devices such as a marker, pen, pencil, paintbrush, or other drawing device can be scanned using a RGB+IR camera simultaneously rather than digitizing each point one by one (e.g., point by point, pixel by pixel) using an expensive electronic point-tracking device. Further, the three-dimensional modeling system creates the three-dimensional mesh using a scan obtained from commercially available scanning equipment rather than specialized equipment used in conjunction with the expensive electronic point-tracking devices. Moreover, features and functionality of the three-dimensional modeling system compensate for various imperfections introduced as a result of non-expert users using non-specialized equipment to capture the scan of the three-dimensional object.

In addition to generating a mesh including an accurate representation of custom mesh lines on a three-dimensional object, the three-dimensional modeling system avoids over-utilizing memory and storage capabilities of a client device when generating a mesh of a three-dimensional object. For example, rather than utilizing extensive processing power to generate a dense mesh including thousands of polynomials that attempt to approximate the intricate surface of the three-dimensional object, the three-dimensional modeling system generates a mesh from custom mesh lines including substantially fewer polynomials and thus utilizing less processing power than conventional three-dimensional scanning systems. Moreover, as described above, the three-dimensional modeling system further constructs the mesh without utilizing electronic point-tracking device that further taxes the processing capabilities of the client device.

Additional detail will now be provided regarding the three-dimensional modeling system in relation to illustrative figures portraying exemplary embodiments. For example, as will be described in greater detail below, FIGS. 1-8 illustrate an example embodiment of a process implemented by the three-dimensional modeling system to generate a three-dimensional model based on a three-dimensional object. In particular, as will be described in further detail below, the three-dimensional modeling system generates a three-dimensional mesh from a scan of a three-dimensional object having mesh lines thereon.

For example, FIG. 1 illustrates an example three-dimensional object 102 (or simply "object 102") including mesh lines 104 drawn over a surface 106 of the object 102. In one or more embodiments, the object 102 refers to a sculpture made from a sculpting material. For instance, a user may create the object 102 by manually sculpting the object 102 from material such as clay, foam (e.g., Styrofoam), mold, paper, wood, or other sculpting material. As will be described in further detail, the three-dimensional modeling system uses the object 102 as a template for creating a digital three-dimensional model of the object 102.

As further shown in FIG. 1, the object 102 includes mesh lines 104 drawn over a surface 106 of the object 102. As mentioned above, the mesh lines 104 can include custom mesh lines drawn or otherwise placed over the surface 106 of the object to emphasize various features of the object 102. For example, as shown in FIG. 1, the mesh lines 104 can include black or other dark ink from a marker or pen used to draw the custom mesh lines 104. Alternatively, the mesh lines 104 can include black or dark material (e.g., sticker, plastic) placed over the surface 106 of the object 102. The mesh lines 104 can include any color of lines that provide a detectable contrast between a color of the surface 106 and a color of the mesh lines 104. For example, as shown in FIG. 1, the custom mesh lines 104 have a dark color in contrast to a light color of the surface 106.

As further shown in FIG. 1, one or more of the custom mesh lines 104 follow the contours, grooves, and other features of the object 102. In particular, where the object 102 refers to a sculpted three-dimensional face, the custom mesh lines 104 include lines that follow the curvature of the surface 106 of the face around the eyes, ears, mouth, nose, chin, hair, and other physical features of the sculpted face. Thus, the mesh lines 104 can emphasize or otherwise highlight various features of the object 102.

As further shown, the mesh lines 104 form a grid across portions of the surface 106 having lines that intersect across the surface 106 of the object 102. The custom mesh lines 104 can have varying levels of granularity. For example, the custom mesh lines 104 can have a low granularity defined by fewer lines running across the surface 106 of the object 102. Alternatively, the custom mesh lines 104 can have a high granularity defined by more lines running across the surface 106 of the object 102. In addition, the thickness of the custom mesh lines 104 may vary depending on the tool or material used to create the mesh lines 104.

As mentioned above, the three-dimensional modeling system receives a scan of the object 102 from a three-dimensional scanner (or simply "scanner"). As used herein, a "scanner" of "scanning device" refers to a commercially available scanning device capable of capturing a scan of a three-dimensional object without utilizing an electronic point-tracking device that works in conjunction with the scanner. For example, in one or more embodiments, the scanning device includes an Xbox Kinect or an Asus Xtion. As will be described in further detail below in connection with FIG. 8, the scanner may include an RGB camera for capturing an image of the object 102. In addition, the scanner may include an IR projector and IR camera to facilitate capturing depth information about the object 102. In one or more embodiments, the three-dimensional modeling system receives a scan including both an image (e.g., two-dimensional image) of the object 102 and accompanying depth information of the object 102 from the scanner.

Figure 2:
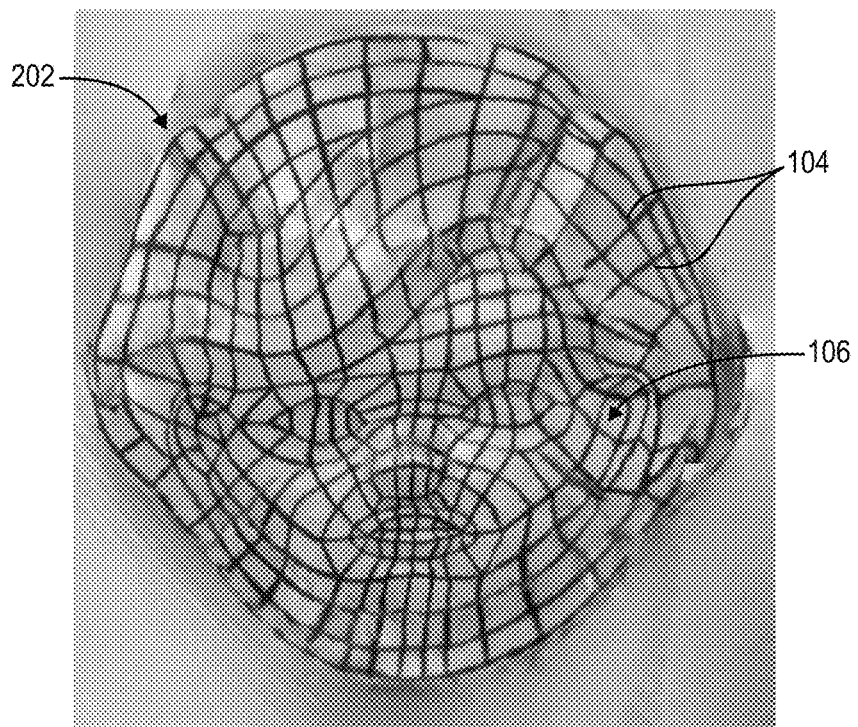
FIG. 2 illustrates an example two-dimensional texture map of the three-dimensional object in accordance with one or more embodiments.

In one or more embodiments, upon receiving the scan of the object 102 including depth information and one or multiple images of the object 102, the three-dimensional modeling system generates a two-dimensional representation for the object 102 including the custom mesh lines 104 over the surface 106 of the object 102. For example, as shown in FIG. 2, the three-dimensional modeling system generates a two-dimensional texture map 202 for the object 102 including an image representative of the object 102 having the custom mesh lines 104 thereon. The three-dimensional modeling system can generate the two-dimensional texture map 202 in various ways and using various algorithms. While one or more embodiments described herein refers to the three-dimensional modeling system generating the two-dimensional texture map 202 of the object 102, in one or more embodiments, the scanner similarly performs one or more steps (e.g., alone or in cooperation with the three-dimensional modeling system) for generating the two-dimensional texture map 202 of the object 102.

For instance, where the scan of the object 102 includes multiple images (e.g., a sequence of RGB images, or video frames) representative of the object 102, the three-dimensional modeling system can generate the two-dimensional texture map 202 (e.g., a texture map) by selectively identifying RBG images (e.g., RGB frames) from which to generate a composite image that makes up the two-dimensional texture map 202. In addition, the three-dimensional modeling system can align the identified images with reconstructed geometry of the object 102 based on captured depth information from the scan. The three-dimensional modeling system can further perform a UV parameterization algorithm to generate the two-dimensional texture map 202 for the object 102.

In addition, as shown in FIGS. 1-2, the three-dimensional modeling system receives or generates a two-dimensional texture map 202 that includes a continuous (e.g., non-segmented) representation of the object 102. Alternatively, while not shown in constructing a three-dimensional mesh for the object 102 shown in FIGS. 1-7, in one or more embodiments, the three-dimensional modeling system generates a two-dimensional texture map 202 including segmented portions of the object 102 (e.g., based on a structure incompatible with a continuous representation of the object 102). In particular, portions of the segmented portions of the two-dimensional texture map 202 may overlap or connect when converted to a three-dimensional model, but fail to connect or overlap when rendered as the two-dimensional texture map. In these cases, the three-dimensional modeling system can further map different segments of the two-dimensional texture map to other segments. Utilizing this mapping information, the three-dimensional modeling system can apply modifications described below equally to corresponding segments to ensure that a constructed three-dimensional mesh includes a continuous representation of a corresponding object.

As shown in FIG. 2, the two-dimensional texture map 202 includes a representation of the custom mesh lines 104 drawn over the surface 106 of the object 102. As shown in FIG. 2, the custom mesh lines 104 can have varying thickness across portions of the two-dimensional texture map 202. Further, in one or more embodiments, the two-dimensional texture map 202 includes a black and white two-dimensional representation of the object 102 where the custom mesh lines 104 have a black color in contrast to a white or light gray background representative of the surface 106 of the object 102. Alternatively, in one or more embodiments, the two-dimensional texture map 202 includes custom mesh lines 104 having a lighter color than the background representative of the surface 106 of the object 102.

In one or more embodiments, the three-dimensional modeling system analyzes the two-dimensional texture map 202 and identifies the mesh lines 104 within the two-dimensional texture map 202. In particular, in one or more embodiments, the three-dimensional modeling system identifies the mesh lines by detecting edges within the two-dimensional texture map 202. The three-dimensional modeling system can detect edges in various ways. For example, the three-dimensional modeling system can detect contrasting pixel values over ranges of the two-dimensional texture map 202 indicative of edges. As another example, the three-dimensional modeling system can identify gradient pixel values or ranges of gradient pixel values to identify contrasting pixels in neighboring areas of the two-dimensional texture map 202 indicative of edges within an image.

In one or more embodiments, the three-dimensional modeling system identifies the custom mesh lines 104 based on an identified color of the custom mesh lines 104 on the object 102. For example, in one or more embodiments, the three-dimensional modeling system receives (e.g., via a user input) or identifies (e.g., detects) a color of ink used to generate the custom mesh lines 104. The three-dimensional modeling system can further compare each pixel of the two-dimensional texture map 202 to a threshold value to determine whether a specific pixel should be characterized as an edge or non-edge. In particular, where custom mesh lines 104 include a black color over a white (or off-white) background, the three-dimensional modeling system can designate each pixel as black or white based on determined pixel values throughout the two-dimensional texture map 202.

Figure 3:
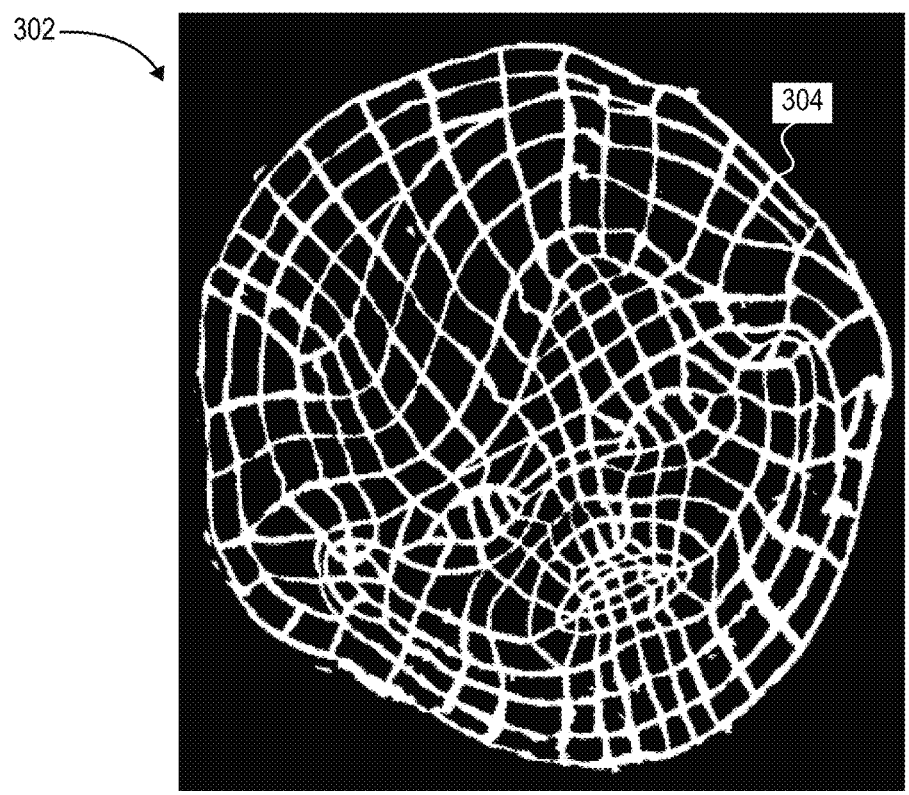
FIG. 3 illustrates an example edge map generated from the two-dimensional scan in accordance with one or more embodiments.

Regardless of the precise method for identifying the mesh lines 104 within the two-dimensional texture map 202, the three-dimensional modeling system can generate an edge map including a representation of the detected or otherwise identified mesh lines 104 of the two-dimensional texture map 202. For example, as shown in FIG. 3, the three-dimensional modeling system generates an edge map 302 including identified edges 304 of the two-dimensional texture map 202. In particular, as shown in FIG. 3, the edge map 302 includes a black and white image in which white pixels represent the edges 304 and black pixels represent non-edges (e.g., all portions of the edge map 302 not determine to correspond to detected lines within the two-dimensional texture map 202).

In one or more embodiments, the three-dimensional modeling system generates the edge map 302 by masking the pixels of the two-dimensional texture map 202 having a darker color or, alternatively, having a color that corresponds to a known color of the mesh lines 104 on the object 102. For example, upon detecting the edges or otherwise identifying the mesh lines 104 within the two-dimensional texture map 202, the three-dimensional modeling system generates the edge map 302 by applying a mask of white pixels over the detected edges 304 and applying black pixels to all remaining portions of the two-dimensional texture map. In one or more embodiments, the three-dimensional modeling system masks the white pixels over the detected edges 304 and applies black pixels throughout the image by determining a threshold difference (e.g., performing a color thresholding operation) between the known color of the mesh lines 104 and other portions of the two-dimensional texture map 202. The three-dimensional modeling system then applies black pixels over portions of the two-dimensional texture map 202 that deviate from the known color of the mesh lines by a threshold difference. As a result, the edge map 302 includes a binary representation of the two-dimensional texture map 202 including white pixel edges 304 over a black background. Alternatively, in one or more embodiments, the edge map 302 includes black pixel edges over a white background.

Figure 4:
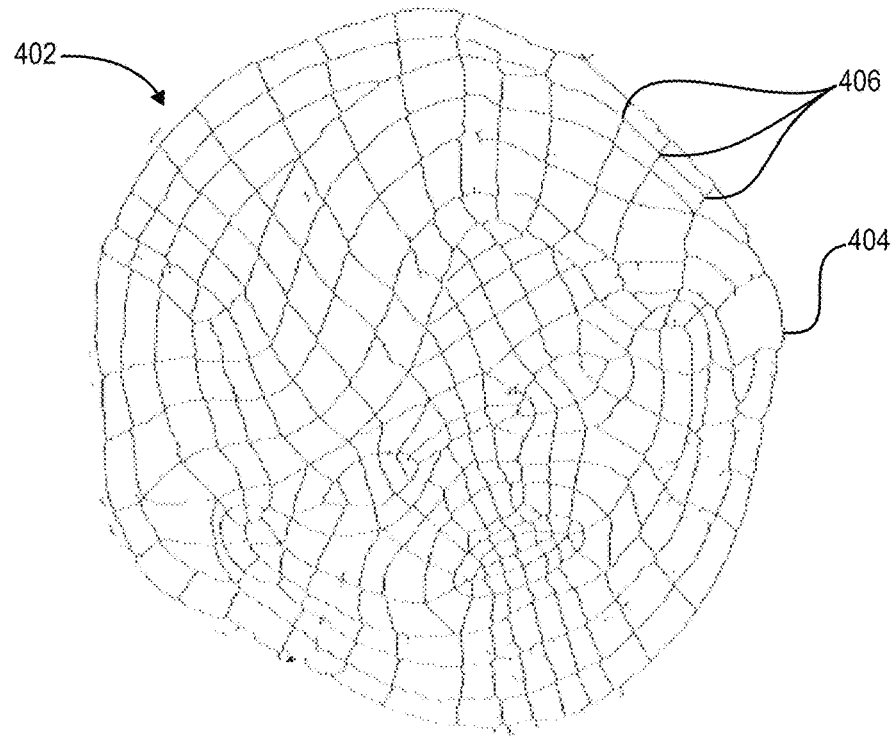
FIG. 4 illustrates an example thinned edge map in accordance with one or more embodiments.

Upon generating the edge map 302, the three-dimensional modeling system can modify the edge map 302 by causing the detected edges 304 throughout the edge map 302 to have a uniform thickness. For example, as shown in FIG. 4, in one or more embodiments, the three-dimensional modeling system modifies the edge map 302 to generate a thinned edge map 402 including thinned edges 404 having a thickness of a single pixel. Thus, as shown in FIG. 4, the thinned edge map 402 includes thinned edges 404 that intersect at junctions 406. As further shown, and as will be described in further detail below in connection with FIGS. 5A-5D, the thinned edge map 402 may include disconnected lines and partially connected lines that fail to connect with other thinned lines 404 at junctions 406.

The three-dimensional modeling system can generate the thinned edge map 402 from the edge map 302 in various ways. As a first example, in one or more embodiments, the three-dimensional modeling system generates the thinned edge map 402 by iteratively thinning the edges 304 from multiple pixels thick to a single pixel thick. For instance, in one or more embodiments, the three-dimensional modeling system identifies boundary pixels of each detected line (e.g., north/south boundary pixels for horizontal lines or east/west boundary pixels for vertical lines). Upon identifying the boundary pixels, the three-dimensional modeling system alternatively deletes opposing boundary pixels until only a single pixel of the line remains. The three-dimensional modeling system can perform a similar thinning process for each of the edges 304 within the edge map 302 to generate the thinned edge map 402 having the thinned edges 404.

As an alternative, in one or more embodiments, the three-dimensional modeling system applies a thinning algorithm (e.g., image skeleton algorithm) to the edges 304 of the edge map 302 to generate the thinned edge map 402 having thinned edges 404 (e.g., a single-pixel width skeleton of the edges 304 of the edge map 302). In particular, in one or more embodiments, the three-dimensional modeling system thins the edges 304 of the edge map 302 using a goal-oriented thinning algorithm that prioritizes (1) connectivity between lines 304 at junctions (e.g., intersections), (2) unchanging curves or unions of curves, (3) causing medial curves to lie along proximate midpoints of lines 304, (4) thin as possible edges 304, (5) and performing as few iterations of the algorithm as possible.

In one or more embodiments, the three-dimensional modeling system combines multiple thinning algorithms (e.g., iteratively thinning edges 304 and goal-oriented thinning algorithm) to generate the thinned edge map 402. For example, in one or more embodiments, the three-dimensional modeling system generates the thinned edge map 402 using multiple thinning algorithms as described in "Parallel Thinning with Two-Subiteration Algorithms" by Zicheng Guo and Richard W. Hall—Communications of the ACM 1989, the entire contents of which are incorporated herein by reference.

As mentioned above, and as shown in FIG. 4, the thinned edge map 402 includes thinned edges 404, junctions 406 and various imperfections or abnormalities throughout including, for example, disconnected lines and partially connected lines. As shown in FIG. 4, and as shown in further detail in FIG. 5A, the thinned edge map 402 includes various features and characteristics that present difficulties in generating a three-dimensional mesh for the scan of the object 102. For example, as will be described in further detail, features of the thinned edge map 402 such as non-straight lines, ambiguous junctions, disconnected lines, and partially connected lines prevent the three-dimensional modeling system from generating a three-dimensional mesh that would be useful in generating a three-dimensional model of the object 102.

In one or more embodiments, the three-dimensional modeling system modifies the thinned edge map 402 to remove or otherwise modify these features that prevent the three-dimensional modeling system from generating a useful three-dimensional mesh for the object 102. For example, as will be described in further detail below in connection with FIGS. 5A-5D, the three-dimensional modeling system can straighten the thinned lines 404 of the thinned edge map 402 to produce a two-dimensional mesh 510 shown in FIG. 5D. In particular, FIGS. 5A-5D illustrate modifications to a zoomed-in portions 502 of the thinned edge map 402. It will be understood that while FIGS. 5A-5D show modifications to the zoomed-in portion 502, the three-dimensional modeling system makes similar modifications to the remaining portions of the thinned edge map 402 to construct the two-dimensional mesh 510 shown in FIG. 5D. Thus, described modifications to the zoomed-in portion 502 similarly apply to modifying all portions of the thinned edge map 402.

Figure 5A:
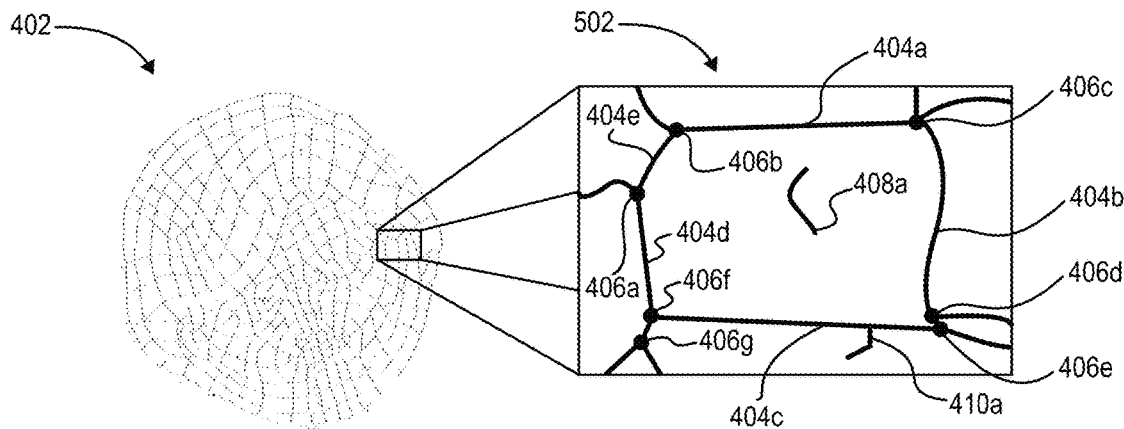
FIGS. 5A-5D illustrate example modifications to a thinned edge map in accordance with one or more embodiments.

For example, FIG. 5A illustrates a zoomed-in portion 502 of the thinned edge map 402 including thinned edges 404a-e, junctions 406a-g, a disconnected line 408a, and a partially connected line 410a. In one or more embodiments, prior to modifying or re-constructing features of the zoomed-in portion 502, the three-dimensional modeling system identifies each of the junctions 406a-g. For instance, in one or more embodiments, the three-dimensional modeling system analyzes the pixels of the zoomed-in portion 502 and identifies all intersections of the thinned edges 404a-e. For example, starting from a junction, the three-dimensional modeling system identifies other junctions by moving along the thinned edges 404a-e until another junction is reached that does not require passing through another junction.

Figure 5B:
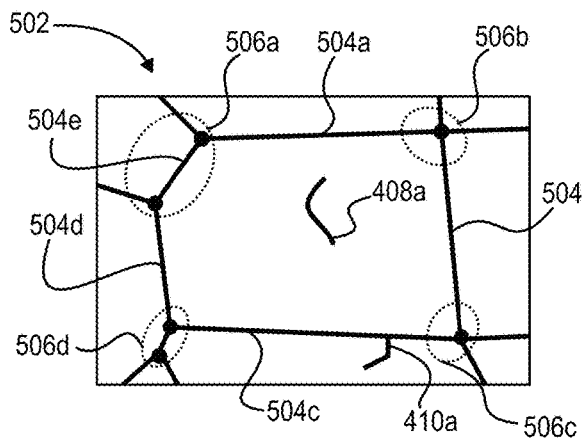

Upon identifying the junctions 406a-g, the three-dimensional modeling system can modify the zoomed-in portion 502 of the thinned edge map 402 by straightening the lines 404a-e. In particular, as shown in FIG. 5B, the three-dimensional modeling system straightens all lines 404a-e determined to connect two of the junctions 406a-g. In one or more embodiments, the three-dimensional modeling system ignores all lines within the zoomed-in portion determined to not connect adjacent junctions 406a-g. For example, as shown in FIG. 5B, the three-dimensional modeling system ignores or otherwise does not modify disconnected line 408a and partially connected line 410a. Alternatively, in one or more embodiments, the three-dimensional modeling system simply removes the disconnected line 408a and partially connected line 410a upon determining that the disconnected line 408a and partially connected line 410a fail to connect two different junctions 406a-g.

As further shown in FIG. 5B, each of the straight lines 504a-e of the zoomed-in portion 502 correspond to a thinned line 404a-e of the thinned edge map 402. In one or more embodiments, the three-dimensional modeling system replaces each of the thinned lines 404a-e with a corresponding straight line 504a-e without generating any new straight lines. Thus, in one or more embodiments, the three-dimensional modeling system maintains a 1:1 ratio of non-straight lines 404a-e to corresponding straight lines 504a-e.

In addition to straightening the thinned lines 404a-e to form the straight lines 504a-e, in one or more embodiments, the three-dimensional modeling system further modifies the zoomed-in portion 502 of the thinned edge map 402 by combining one or more junctions 406a-g to form vertices 508a-d that define a structure of the two-dimensional mesh 510. For example, in one or more embodiments, as a result of thinning the edges 302 of the edge map 304 to generate the thinned edge map 402, the resulting zoomed-in portion 502 includes one or more of the junctions 406a-g meant to be a single vertex (e.g., an intersections of the custom mesh lines that became two junctions as a result of thinning the edge map 302). To fix this issue caused by thinning the edges 304 of the edge map 302, the three-dimensional modeling identifies candidate vertices 506a-d including multiple junctions 406a-g.

In one or more embodiments, the three-dimensional modeling system identifies the candidate vertices 506a-d by identifying multiple junctions 406a-g within a threshold distance of each other. For example, in one or more embodiments, the three-dimensional modeling system identifies candidate vertices 506a-d by identifying any of the junctions 406a-g of the zoomed-in portion 502 within a threshold number of pixels from another junction. For example, as shown in FIG. 5B, the three-dimensional modeling system identifies a first candidate vertex 506a including junctions 406a-b, a second candidate vertex 506b including a single junction 406c, a third candidate vertex 506c including junctions 406d-e, and a fourth candidate vertex 506d including junctions 406f-g.

As an alternative to simply combining junctions 406a-g within a threshold distance of each other, the three-dimensional modeling system can further consider a number of sides of a resulting polygon formed by combining the junctions 406a-g. For example, in one or more embodiments, the three-dimensional modeling system prioritizes combining junctions 406a-d to form a shape having three or four sides. As shown in FIG. 5B, the straight lines 504a-e form a polygon having five sides. Upon combining junctions of the candidate vertices 506a-d, the three-dimensional modeling system forms a four-sided polygon defined by vertices 508a-d and edges 509a-d. As an alternative to generating polygons having four sides, in one or more embodiments, the three-dimensional modeling system generates polygons having three sides. In one or more embodiments, the three-dimensional modeling system generates a two-dimensional mesh including polygons having both three and four sides.

In defining the candidate vertices 506a-d or otherwise determining which junctions 406a-g to combine, the three-dimensional modeling system can determine a number of combined junctions needed to form a polygon having a predetermined number of sides. For example, with regard to constructing the two-dimensional mesh 510, the three-dimensional modeling system can receive or otherwise identify a setting that indicates faces of the two-dimensional mesh 510 should have four sides. Thus, the three-dimensional modeling system may choose junctions 406a-g to combine in order to form polygons having four sides.

Figure 5C:
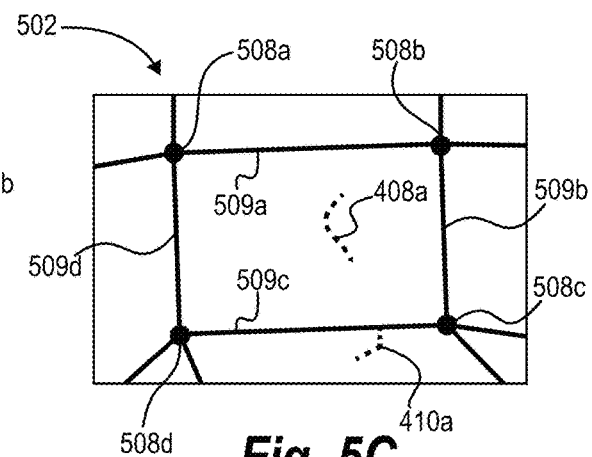

Upon identifying the predetermined number of sides, the three-dimensional modeling system can define the candidate vertices 506a-d around the junctions 406a-g based on the predetermined number of sides. For example, for the five-sided polygon shown in FIG. 5B, the three-dimensional modeling system can determine that combining only two junctions would result in a four-sided polygon as shown in FIG. 5C. Thus, the three-dimensional modeling system can determine which junctions of the five-sided polygon have the closest position (e.g., junctions 406a-b) and define the first candidate vertex 506a around the junctions 406a-b based on the proximity determination. Thus, in one or more embodiments, the three-dimensional modeling system defines the candidate vertices based on a combination of a target number of sides for polygons of the two-dimensional mesh and a proximity of the junctions 406a-g of the zoomed-in portion 502 of the thinned edge map 402.

In one or more embodiments, upon defining the candidate vertices 506a-d, the three-dimensional modeling system can further modify the zoomed-in portion 502 to form a polygon face (e.g., a four-sided polygon) of the two-dimensional mesh 510. In particular, in one or more embodiments, the three-dimensional modeling system forms the vertices 508a-d by combining junctions 406a-g within corresponding candidate vertices 506a-d. For example, as shown in FIG. 5C, the junctions 406a-b combine to form a first vertex 508a, the junction 406c forms the second vertex 408b, the junctions 406d-e form a third vertex 408c, and junctions 406f-g form a fourth vertex 408d. As further shown, each of the vertices 508a-d are connected by edges 509a-d of the polygon.

The three-dimensional modeling system can combine the junctions 406a-g in various ways. For example, in one or more embodiments, the three-dimensional modeling system combines the junctions 406a-g by generating a vertex at a midpoint or central location between each of the nearby junctions that make up a candidate vertex. As an example, the three-dimensional modeling system generates the first vertex 508a at a midpoint on the straight line 504e between junctions 406a-b.

As an alternative, in one or more embodiments, the three-dimensional modeling system generates a vertex at a location based on a predetermined size and/or shape (e.g., rectangle, triangle) for the polygon. For example, when combining the junctions 406a-b of the first candidate vertex 506a to form the first vertex 508a, the three-dimensional modeling system can generate the first vertex 508a at a location to form a rectangular polygon (or approximately rectangular), even if the location of the first vertex 508a does not lie at a midpoint between the junctions 406a-b. Thus, the three-dimensional modeling system can combine junctions throughout the thinned edge map 402 to form polygons of the two-dimensional mesh 510 having shapes as close as possible to rectangles. In addition, or as an alternative, in one or more embodiments, the three-dimensional modeling system prioritizes placement of the various vertices to generate polygons having similar sizes.

In addition, as shown in FIG. 5C, the three-dimensional modeling system can remove the disconnected line 408a from the zoomed-in portion 502. For example, the three-dimensional modeling system can remove the disconnected line 408a based on determining that the disconnected line 408a fails to connect to any edges 509a-d of the zoomed-in portion 502. In one or more embodiments, the three-dimensional modeling system removes the disconnected line 408a after performing one or more modifications described in connection with FIGS. 5A-5D. Alternatively, in one or more embodiments, the three-dimensional modeling system removes the disconnected line 408a prior to modifying the lines 404a-e of the thinned edge map 402 to form the straight lines 504a-e. For example, in one or more embodiments, the three-dimensional modeling system removes the disconnected line 408a in response to detecting that the disconnected line 408a fails to form a junction with any other lines of the thinned edge map 402.

Similarly, as shown in FIG. 5C, the three-dimensional modeling system can remove the partially connected line 410a from the zoomed-in portion 502. For example, the three-dimensional modeling system can remove the partially connected line 410a based on determining that the partially connected line 410b fails to connect two adjacent junctions 406a-g. Similar to removing the disconnected line 408a, the three-dimensional modeling system can remove the partially connected line 410b at any stage of modifying the thinned edge map 402 to form the two-dimensional mesh 510. For example, in one or more embodiments, the three-dimensional modeling system removes the partially connected line 410b prior to generating any of the straight lines. In particular, in one or more embodiments, the three-dimensional modeling system removes the partially connected line 410b upon determining that only one end-point (e.g., not both end-points) of the partially connected line 410b connects to other lines of the thinned edge map 402.

Figure 5D:
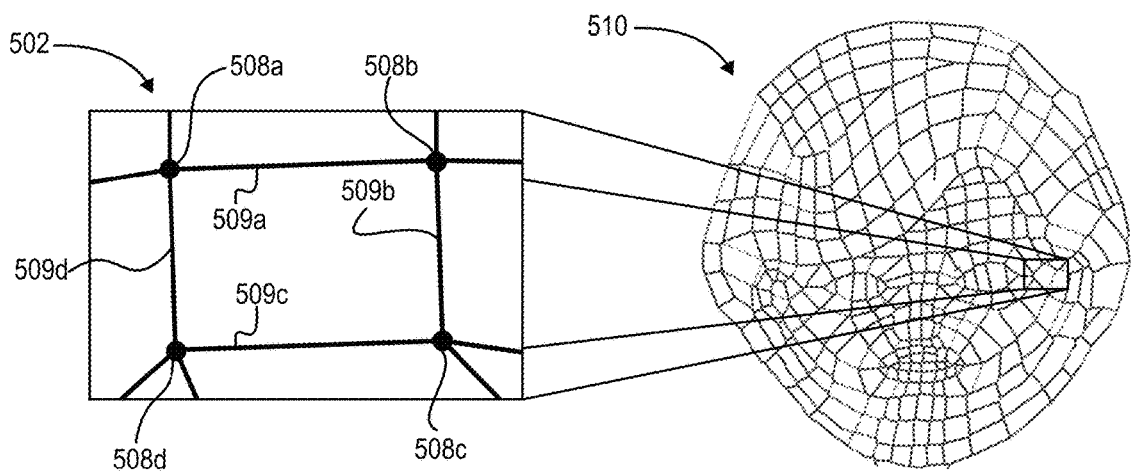

Thus, the three-dimensional modeling system can modify the thinned edge map 402 to form the two-dimensional mesh 510 shown in FIG. 5D. In particular, as a result of the modifications to the zoomed-in portion 502, the three-dimensional modeling system forms a four-sided polygon having a face defined by vertices 508a-d and polygon edges 509a-d. As further shown in FIG. 5D, the three-dimensional modeling system can perform similar modifications to all portions of the thinned edge map 402 to form the two-dimensional mesh 510 having straight edges and polygons of a predetermined number of sides throughout. For example, as shown in FIG. 5D, the resulting two-dimensional mesh 510 includes polygons having four sides throughout. Alternatively, in one or more embodiments, the three-dimensional modeling system generates a two-dimensional mesh including polygons having three sides (or other predetermined number) throughout.

Figure 6:
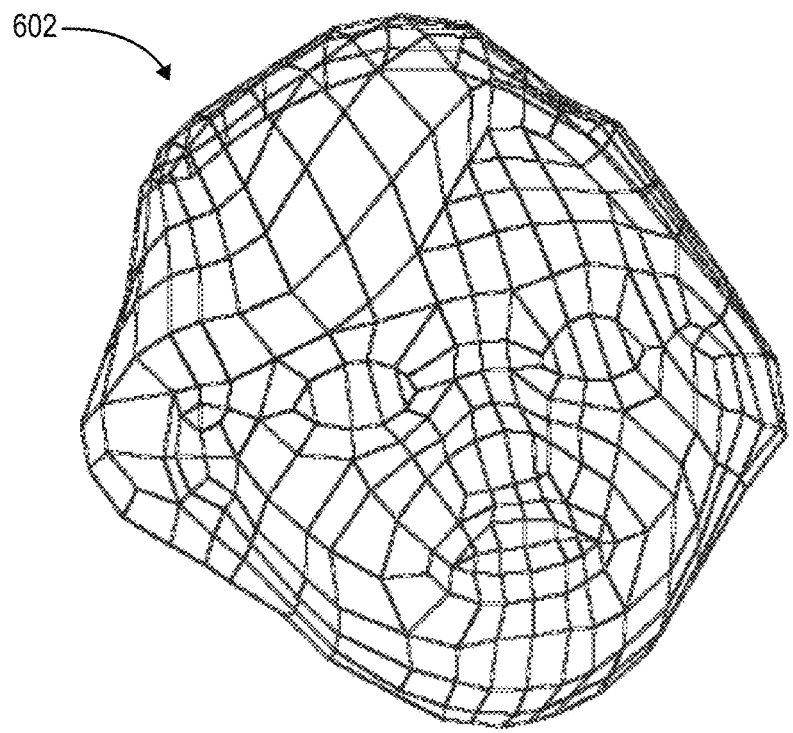
FIG. 6 illustrates an example mesh constructed from the edge map in accordance with one or more embodiments.

Upon generating the two-dimensional mesh 510, the three-dimensional modeling system can generate a three-dimensional mesh based one vertices and edges of the two-dimensional mesh 510 and depth information from the scan of the object 102. For example, as shown in FIG. 6, the three-dimensional modeling system generates a three-dimensional mesh 602 (e.g., a line/edge rendering of the three-dimensional mesh) including a three-dimensional structure based on depth information of the object 102. In particular, as shown in FIG. 6, the three-dimensional mesh 602 includes a rendering of edges and vertices corresponding to edges and vertices of the two-dimensional mesh 510. The edges and vertices define faces of the three-dimensional mesh 602.

The three-dimensional modeling system can generate the three-dimensional mesh 602 from the two-dimensional mesh 510 and depth information in a number of ways. For example, in one or more embodiments, the three-dimensional modeling system maps the vertices and edges of the two-dimensional mesh 510 to a three-dimensional space. In one or more embodiments, the three-dimensional modeling system maps the vertices and edges to a three-dimensional space using one of various UV parameterization techniques including, for example, barycentric mapping, differential geometry primer, and/or one or more non-linear methods.

In one or more embodiments, the UV parameterization techniques are performed when generating the two-dimensional texture map from the images and three-dimensional information obtained using the scanning device. As such, where the three-dimensional modeling system may already have a 1:1 mapping between the three-dimensional mesh and the two-dimensional texture map. In this case, the three-dimensional modeling system may simply generate the three-dimensional mesh based on the 1:1 mapping previously generated or otherwise obtained based on the images and depth information.

Figure 7:
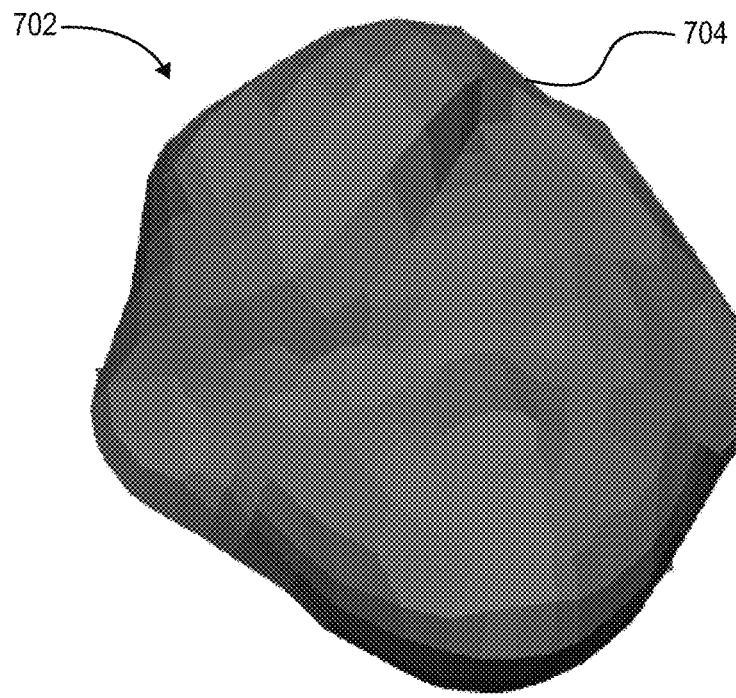
FIG. 7 illustrates an example mesh rendered using polygonal faces in accordance with one or more embodiments.

As shown in FIG. 6, the three-dimensional modeling system can generate the three-dimensional mesh including a rending of edges defined by the vertices and edges. In addition, or as an alternative, the three-dimensional modeling system can generate a three-dimensional mesh including a rendering of faces formed by the vertices and edges. For example, as shown in FIG. 7, the three-dimensional modeling system generates a face-rendering of the three-dimensional mesh 702 including faces 704 defined by the lines and edges of the three-dimensional mesh structure. Furthermore, with regard to either the edge-rendering of the three-dimensional mesh 602 or the face-rendering of the three-dimensional mesh 702, in one or more embodiments, a user may interact with the resulting three-dimensional mesh 602, 702 to edit or otherwise modify portions of the three-dimensional mesh 602, 702.

Figure 8:
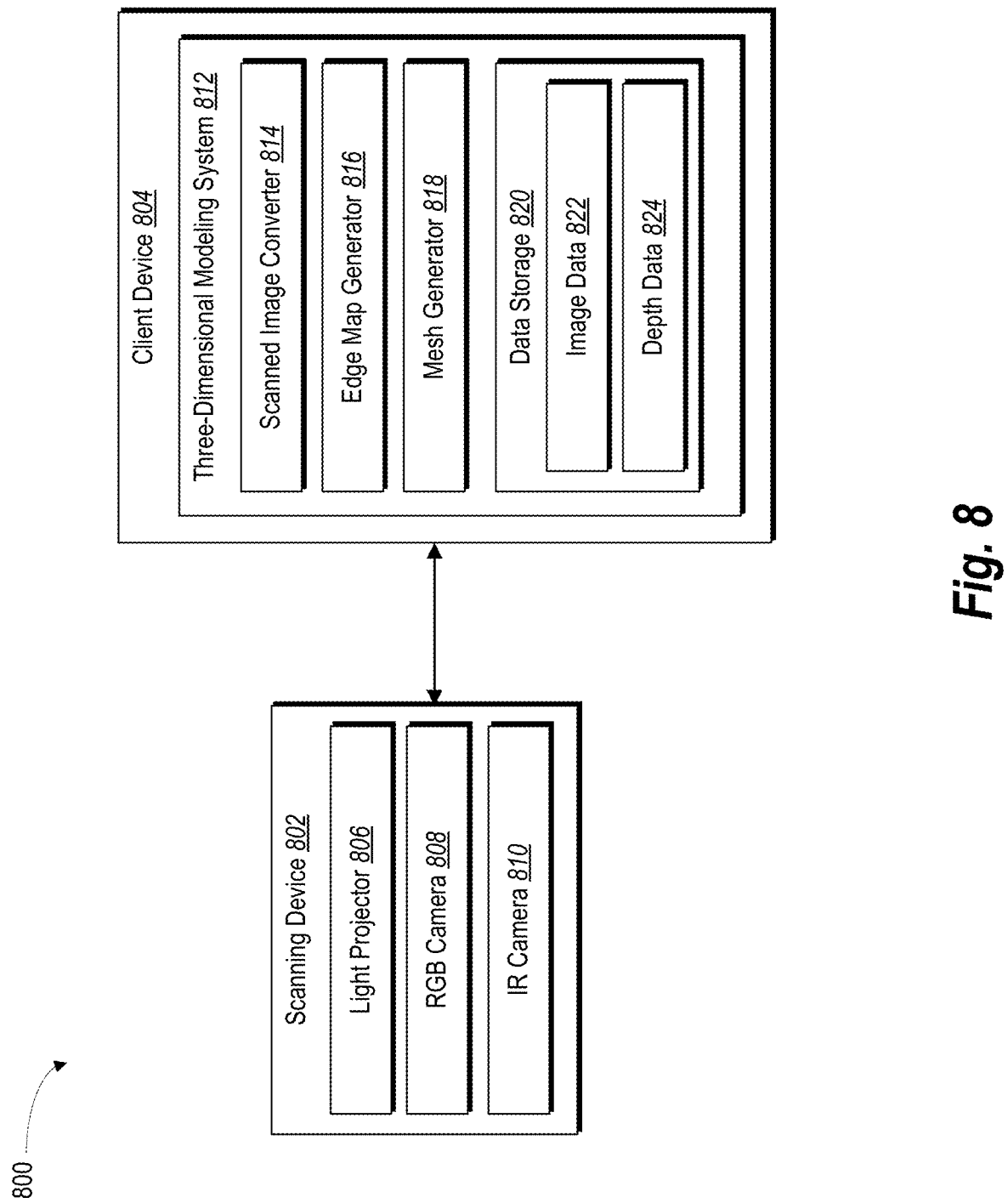
FIG. 8 illustrates a schematic diagram of an example scanning based three-dimensional model generation system in accordance with one or more embodiments.

Turning now to FIG. 8, additional detail will be provided regarding components and capabilities of an example architecture for a three-dimensional modeling system 812 that may be implemented on a client device 804 in accordance with one or more embodiments. In particular, FIG. 8 illustrates an example embodiment of a three-dimensional modeling environment 800 including a scanning device 802 and a client device 804 having the three-dimensional modeling system 812 thereon and that cooperate to accomplish features and functionality associated with one or more embodiments described above. For example, the scanning device 802 and client device 804 can cooperate to generate a three-dimensional model 702 of an object 102 based on a scan of the object 102 having custom mesh lines 104 drawn thereon.

As shown in FIG. 8, the three-dimensional modeling environment 800 includes a scanning device 802. The scanning device 802 can include a camera and a depth sensor. For example, as shown, the scanning device 802 includes a light projector 806, an RGB (Red Green Blue) camera 808, and an IR (Infrared) camera 810. In one or more embodiments, the scanning device 802 captures a scan of a three-dimensional object (e.g., object 102) and provides the scan to the client device 804 for generating a three-dimensional model. In addition, while FIG. 8 illustrates the scanning device 802 and the client device 804 as two separate devices, in one or more embodiments, the client device includes the scanning device 802 or one or more components 806-810 of the scanning device 802 implemented thereon. Thus, while one or more embodiments described herein describe capturing a scan of a three-dimensional object using a scanning device 802, it will be understood that, in one or more embodiments, the client device 804 captures the scan of the three-dimensional object.

Thus, as discussed above, the scanning device 802 captures a scan including one or more images of an object and depth information associated with the object. For example, in one or more embodiments, the RGB camera 808 captures a sequence of multiple images of an object. The RGB camera 808 can capture multiple images of the object from different perspectives in order to generate or otherwise construct a two-dimensional image that represents the three-dimensional object. In one or more embodiments, the RGB camera 808 captures a video of the object including the sequence of images (e.g., video frames) and constructs a two-dimensional texture map of the three-dimensional object from the frames of the video.

In addition, the scanning device 802 captures depth information of the object using the light projector 806 and IR camera 810. For example, in one or more embodiments, the light projector 806 projects infrared (IR) dots or other IR lights that fall on the three-dimensional object. In particular, the light projector 806 projects a pattern of IR dots viewable by the IR camera 810. The IR camera 810 analyzes the pattern of IR dots to determine characteristics and/or distortions of individual dots or the overall pattern of dots. For example, on portions of the object closer to the IR camera 810, the pattern of dots appear farther apart. Alternatively, on portions of the object further from the IR camera 810, the pattern of dots appear more dense (or closer together).

Based on the observed pattern of dots projected over the surface of the object, the scanning device 802 identifies depth information for the object. For example, in one or more embodiments, the scanning device 802 generates a depth map or other representation of the depth of the object. In one or more embodiments, the scanning device 802 utilizes the series of images captured by the RGB camera 808 in conjunction with the depth information captured by the IR camera 810 to generate the scan including a two-dimensional texture map of the object and associated depth information.

In one or more embodiments, the scanning device 802 constructs a scan including a two-dimensional texture map of the object and depth information of the object. For example, in one or more embodiments, the scanning device 802 generates a composite image from a sequence of multiple images captured by the RGB camera 808 and further generates a depth map or other representation of the depth information captured using the light projector 806 and IR camera 810. After generating the scan including both the two-dimensional texture map of the object and corresponding depth information, the scanning device 802 can provide the scan to the client device 804.

As an alternative to generating the scan on the scanning device 802, in one or more embodiments, the scanning device 802 provides scanning data including the sequence of multiple images captured by the RGB camera 808 and depth information captured by the IR camera 810. In particular, rather than generating a scan including processed data, the scanning device 802 can simply provide the raw data from performing the scan of the object to the client device 804 to enable the client device 804 to generate the two-dimensional texture map and corresponding depth map for the three-dimensional object.

In particular, as shown in FIG. 8, the three-dimensional modeling system 812 includes a scanned image converter 814 that converts data obtained from the scan to a two-dimensional texture map of the object. For example, in one or more embodiments, the scanned image converter 814 generates a model including a composite image from the sequence of images captured by the RGB camera 808 and based on depth information captured by the IR camera 810. The two-dimensional texture map of the object includes color of the object including, for example, a color of a surface of the object and a color of mesh lines drawn or otherwise placed on the surface of the object.

In one or more embodiments, the scanned image converter 814 generates the two-dimensional texture map of the object from the captured images (e.g., RGB images) and the depth information. For example, in one or more embodiments, the scanned image converter 814 receives depth frames and RGB images from the scanning device 802. In one or more embodiments, the depth frame and the RGB images are registered to each other. In particular, for each three-dimensional point represented by the depth map, the scanned image converter 814 recognizes a corresponding color from the RGB image. In one or more embodiments, the scanned image converter 814 implements a scanning algorithm to register all the depth images to generate a three-dimensional model of the scanned object. Because the color of each vertex on the mesh from the TGB images is known (based on the composite image from the sequence of images), the scanned image converter 814 applies a mesh parameterization algorithm (e.g., UV parameterization) to find a mapping from the three-dimensional mesh surface to the two-dimensional domain.

Upon identifying the mapping of the two-dimensional domain, the scanned image converter 814 transfers the color of the three-dimensional mesh to the two-dimensional domain to obtain a two-dimensional image (e.g., as shown in FIG. 2) referred to herein as a two-dimensional texture map. Once the two-dimensional texture mapping is created, any modifications performed to the two-dimensional texture map (e.g., thinning, combining vertices, etc.) can be easily applied to a three-dimensional mapping of the two-dimensional texture map.

As further shown in FIG. 8, the three-dimensional modeling system 812 includes an edge map generator 816. In one or more embodiments, the edge map generator 816 generates an edge map for the two-dimensional texture map of the object. For example, in one or more embodiments, the edge map generator 816 evaluates the two-dimensional texture map and detects or otherwise identifies edges throughout the two-dimensional texture map corresponding to mesh lines or contrasting colors between portions of the two-dimensional texture map. For instance, where the object includes custom mesh lines on the surface of the object, the edge map generator 816 identifies lines corresponding to contrasting pixel values caused by different colors of custom mesh lines drawn on the object and the surface of the object.

In addition to identifying edges throughout the two-dimensional texture map of the object, the edge map generator 816 generates an edge map of the two-dimensional texture map. In one or more embodiments, the edge map includes a binary representation of the two-dimensional image including white pixels corresponding to identified edges and black pixels identifying other portions of the two-dimensional texture map.

To compensate for edges within the edge map having variable thickness and other imperfections (e.g., disconnected edges, partially connected edges), the three-dimensional modeling system 812 can modify the edge map to generate a two-dimensional mesh for the object. In particular, as shown in FIG. 8, the three-dimensional modeling system 812 includes a mesh generator 818 that performs one or more modifications to the edge map to generate a two-dimensional mesh for the object. More specifically, in one or more embodiments, the mesh generator 818 performs various modifications to the edge map to generate a two-dimensional mesh having lines, vertices, and faces that correspond to the custom mesh lines drawn over a surface of the object.

For example, in one or more embodiments, the mesh generator 818 generates a thinned edge map including thinned edges of the edge map. In particular, the mesh generator 818 can apply one or more thinning algorithms to modify the edges (e.g., thinning the edges) to generate a thinned edge map including single-pixel edges corresponding to the edges of variable thickness throughout the edge map. As a result, the thinned edge map includes modified single-pixel thick edges throughout the resulting edge map.

Upon generating the thinned edge map, the mesh generator 818 further modifies the edge map (e.g., the thinned edge map) by identifying junctions within the edge map and straightening the edges connecting the identified junctions. For example, in one or more embodiments, the mesh generator 818 generates straight edges connecting adjacent junctions within the thinned edge map to replace each of the non-straight edges of the thinned edge map.

In addition, in one or more embodiments, the mesh generator 818 combines one or multiple junctions of the edge map to form vertices of a two-dimensional mesh. In particular, in one or more embodiments, the mesh generator 818 identifies candidate vertices by identifying junctions within a threshold distance or, when combined, form a polygon having a determined number of edges. For example, in one or more embodiments, the mesh generator 818 combines junctions to form a two-dimensional mesh having four-sided polygons throughout the resulting two-dimensional mesh. Alternatively, the mesh generator 818 can combine junctions to form a two-dimensional mesh having three-sided polygons throughout the resulting two-dimensional mesh.

In one or more embodiments, the mesh generator 818 applies depth information from the scan of the three-dimensional object to the two-dimensional mesh to form a three-dimensional mesh having a structure corresponding to the structure of the three-dimensional object. In addition, the lines, vertices, and faces of the three-dimensional mesh correspond to the custom mesh lines on the surface of the object. For example, in one or more embodiments, the mesh generator 818 maps the vertices, edges, and faces of the two-dimensional mesh to a three-dimensional structure using one of various UV parameterization techniques.

In addition, in one or more embodiments, the three-dimensional modeling system 812 generates a three-dimensional model for the object based on the three-dimensional mesh. In this way, the three-dimensional modeling system 812 enables a user to interact with, edit, and otherwise manipulate the three-dimensional model in accordance with user or design preferences. Thus, the three-dimensional modeling system 812 facilitates construction of a three-dimensional model including features that enable a user to intuitively interact and edit the three-dimensional model.

As further shown in FIG. 8, the three-dimensional modeling system 812 includes a data storage 820 image data 822 and depth data 824. The image data 822 can include information associated with captured images of an object. For example, the image data 822 can include a series of video frames or images captured by the scanning device 802. The image data 822 can further include identified colors of the object and/or a color of the mesh lines drawn over the surface of the object. In addition, the depth data 824 includes any information about the depth or geometry of the object. For example, the depth data 824 can include information about edges, cracks, curves, or other surface features of an object captured by the scanning device 802. In one or more embodiments, the three-dimensional modeling system 812 utilizes both the image data 822 and depth data 824 to generate the two-dimensional texture map of the object and subsequently generate the three-dimensional mesh of the object.

FIGS. 1-8, the corresponding text, and the example, provide a number of different systems and devices that enable generating a three-dimensional mesh of a three-dimensional object including vertices, edges, and faces based on custom mesh lines on a surface of the three-dimensional object. In addition to the foregoing, embodiments can also be described in terms of flowcharts comprising acts and steps in a method for accomplishing a particular result. For example, FIGS. 9-10 illustrate flowcharts of exemplary methods and acts in accordance with one or more embodiments.

Figure 9:
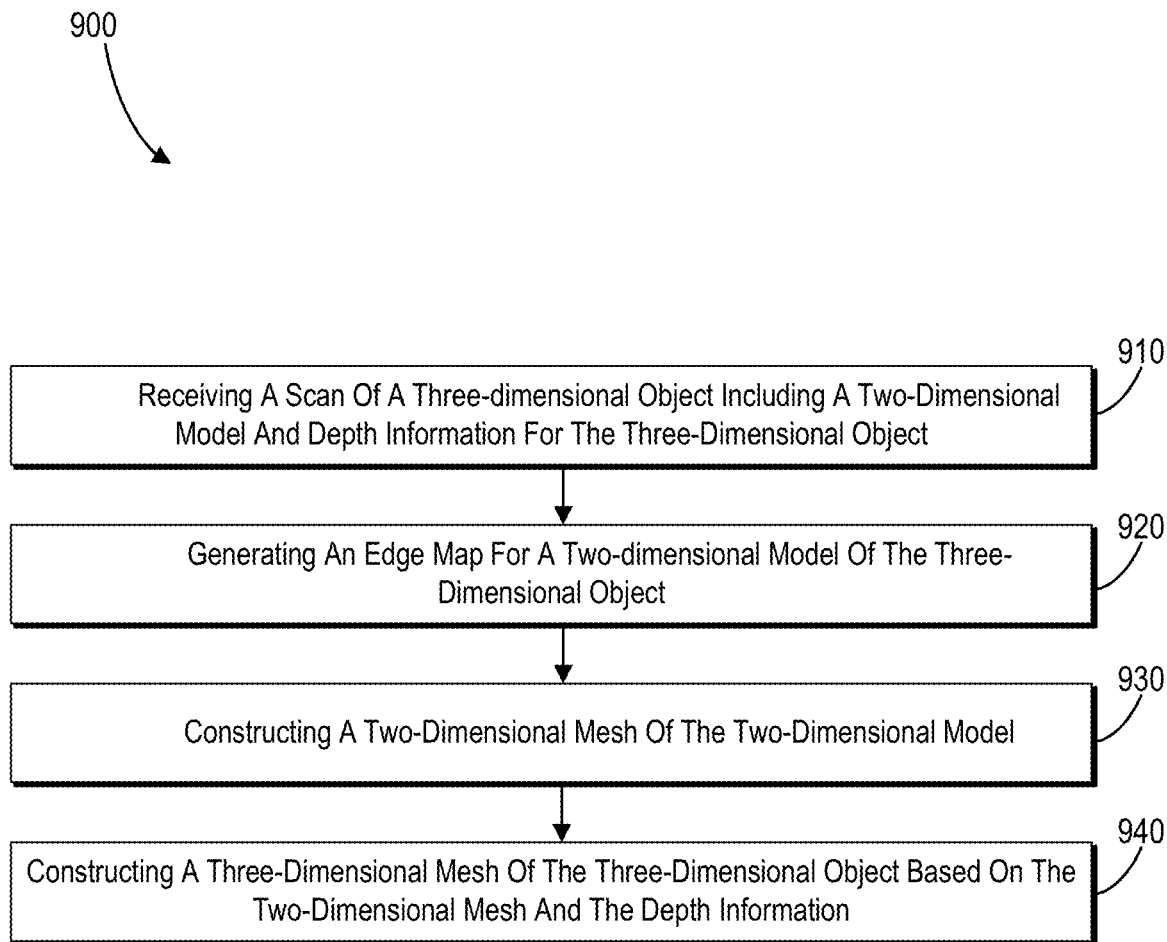
FIG. 9 illustrates a flow chart of a series of acts for generating three-dimensional model of a three-dimensional object in accordance with one or more embodiments.
Figure 10:
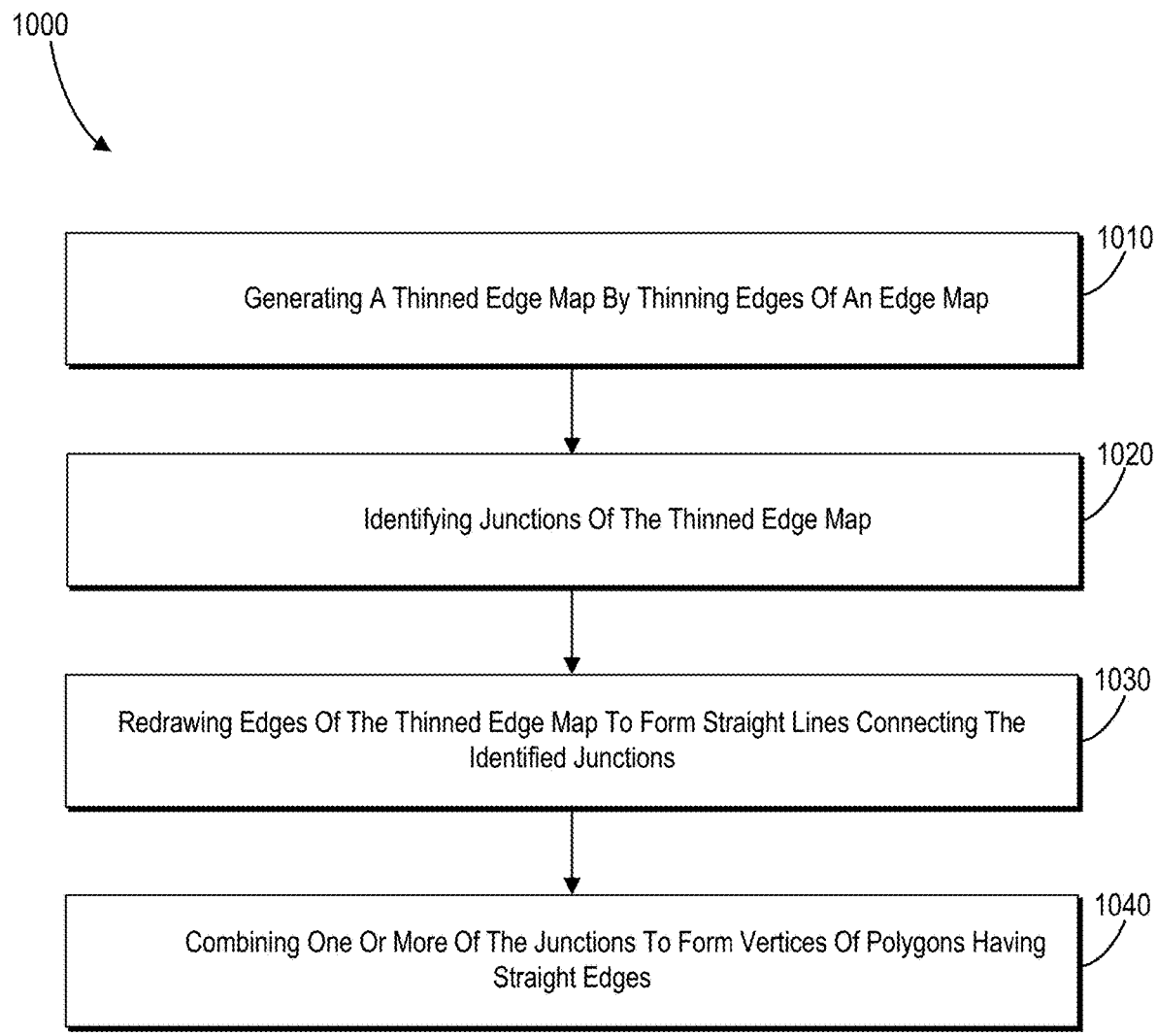
FIG. 10 illustrates a series of acts for constructing a mesh of a three-dimensional object in accordance with one or more embodiments.

FIG. 9 illustrates a flowchart of one example method 900 for constructing a three-dimensional mesh from a scan of a three-dimensional object. In particular, the method 900 relates to generating a three-dimensional mesh having vertices, edges, and faces corresponding to lines of a custom mesh on a surface of the three-dimensional object.

As shown in FIG. 9, the method 900 includes an act 910 of receiving a scan of a three-dimensional object including a two-dimensional texture map and depth information for the three-dimensional object. For example, in one or more embodiments, the act 910 involves receiving a scan of a three-dimensional object including custom mesh lines where the scan includes a two-dimensional texture map of the three-dimensional object based on one or more images of the three-dimensional object and depth information for the three-dimensional object. In one or more embodiments, the custom mesh lines include hand-drawn lines drawn over a surface of the three-dimensional object.

In addition, in one or more embodiments, the method 900 includes generating the two-dimensional texture map. For example, in one or more embodiments, the method 900 includes generating the two-dimensional texture map by combining one or more images of the three-dimensional object into a composite two-dimensional image based on the depth information for the three-dimensional object.

As further shown in FIG. 9, the method 900 includes an act 920 of generating an edge map for a two-dimensional texture map of the three-dimensional object. For example, in one or more embodiments, the act 920 involves generating an edge map from the two-dimensional texture map by detecting edges within the two-dimensional texture map corresponding to the custom mesh lines. In one or more embodiments, generating the edge map includes generating a binary representation of the two-dimensional texture map. In particular, the binary representation includes a first plurality of pixels (e.g., pixels identified as part of an edge) having a first pixel value (e.g., white) and a second plurality of pixels (e.g., the remaining pixels not identified as part of an edge) having a second pixel value (e.g., black).

For example, in one or more embodiments, the method includes receiving an indication of a color of the custom mesh lines on the three-dimensional object. In one or more embodiments, generating the edge map involves detecting edges within the two-dimensional texture map having pixel values corresponding to the color of the text line. For example, where the custom mesh lines include blue lines drawn over a white surface, generating the edge map may involve detecting blue pixels of the two-dimensional texture map.

As further shown in FIG. 9, the method 900 includes an act 930 of constructing a two-dimensional mesh of the two-dimensional texture map. For example, in one or more embodiments, the act 930 includes constructing a two-dimensional mesh of the two-dimensional texture map including reconstructed edges of the edge map. In one or more embodiments, constructing the two-dimensional mesh includes generating a thinned edge map having edges of a uniform thickness. For example, in one or more embodiments, constructing the two-dimensional mesh involves thinning the edges of the edge map to be a single pixel thick. As discussed above, thinning the edges may include performing one or more thinning algorithms to generate a thinned edge map including edges having a single-pixel thickness.

In one or more embodiments, constructing the two-dimensional mesh includes identifying junctions of the thinned edge map. In addition, in one or more embodiments, constructing the two-dimensional mesh includes generating vertices for the two-dimensional mesh by combining junctions at locations within the thinned edge map within a threshold distance of each other. In addition, in one or more embodiments, constructing the two-dimensional mesh includes generating the reconstructed edges of the edge map by replacing edges connecting the identified junctions with straight edges that connect the identified junctions of the thinned edge map.

Moreover, in addition to identifying junctions of the thinned edge map, constructing the two-dimensional mesh includes identifying two junctions connected by an edge of the thinned edge map at locations within the edge map within a threshold distance of each other. In addition, constructing the two-dimensional mesh includes determining that combining the two junctions into a vertex would form a polygon having a predetermined number of sides. Further, in one or more embodiments, constructing the two-dimensional mesh includes removing the edge connecting the two junctions and combining the two junctions into a single vertex. For example, the constructing the two-dimensional mesh includes removing the edge in response to identifying that the two junctions are at locations within the threshold distance of each other and that combining the two junctions into a vertex would form a polygon having a predetermined number of sides.

In addition, in one or more embodiments, constructing the two-dimensional mesh includes removing any detected edges of the edge map that fail to connect to any identified junctions of the edge map. Further, in one or more embodiments, constructing the two-dimensional mesh includes removing any detected edges of the edge map having only a single end-point that connects with another detected edge of the edge map.

As further shown in FIG. 9, the method 900 includes an act 940 of constructing a three-dimensional mesh of the three-dimensional object based on the two-dimensional mesh and the depth information. For example, in one or more embodiments, the act 940 includes constructing a three-dimensional mesh of the three-dimensional object based on the two-dimensional mesh and the depth information, the three-dimensional mesh comprising polygons corresponding to the custom mesh lines. In one or more embodiments, constructing the three-dimensional mesh includes generating a three-dimensional representation of the two-dimensional texture map based on the depth information for the three-dimensional object.

In addition or as an alternative to one or more acts (e.g., acts 930-940) of the method 900, in one or more embodiments, the method 900 includes a step for constructing a three-dimensional mesh of the three-dimensional object using the edge map and the depth information. In particular, the three-dimensional mesh includes polygons corresponding to the custom mesh lines on the three-dimensional object. In one or more embodiments, the step for constructing the three-dimensional mesh includes a series of acts for modifying the generated edge map to construct the three-dimensional mesh.

For example, FIG. 10 illustrates a series of acts 1000 in one embodiment of performing a step for constructing the three-dimensional mesh of the three-dimensional object using the edge map and the depth information. The acts can include an act 1010 of generating a thinned edge map by thinning edges of the edge map. For example, in one or more embodiments, the act 1010 includes generating a thinned edge map by thinning edges of the edge map to have a uniform pixel thickness. In one or more embodiments, thinning the edges of the edge map includes iteratively deleting opposing boundary pixels of the edges of the edge map until the edges include thinned edges having a single-pixel thickness while preserving junctions of the thinned edge map.

As further shown in FIG. 10, the series of acts 1000 includes an act 1020 of identifying junctions of the thinned edge map. For example, in one or more embodiments, the act 1020 includes identifying junctions of the thinned edge map by identifying intersections of the thinned edges throughout the thinned edge map. In addition, as shown in FIG. 10, the series of acts 1000 includes an act 1030 of redrawing edges of the thinned edge map to form straight lines connecting the identified junctions. For example, in one or more embodiments, the act 1030 includes replacing the thinned edges of the edge maps to form straight lines connecting each of the identified junctions.

Moreover, as shown in FIG. 10, the series of acts 1000 includes an act 1040 of combining one or more of the junctions to form vertices of polygons having straight edges. For example, in one or more embodiments, the act 1040 includes combining one or more of the junctions to form vertices of the polygons having straight edges corresponding to the custom mesh lines. In one or more embodiments, combining the junctions to form the polygons includes combining any two or more junctions having locations within a threshold distance of each other into a vertex.

In one or more embodiments, the step for constructing the three-dimensional mesh of the three-dimensional object using the edge map and the depth information comprises identifying junctions in the edge map. The step for constructing the three-dimensional mesh can then involve identifying a center pixel of each identified junction. The step for constructing the three-dimensional mesh can then involve generating a thinned edge map by thinning edges of the edge map while constraining the location of the identified junctions. In such embodiments, the step for constructing the three-dimensional mesh may not involve combining one or more of the junctions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as an un-subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing un-subscription model can be composed of various characteristics such as, for example, on-demand self-service, broad network access, resource pooling, rapid elasticity, measured service, and so forth. A cloud-computing un-subscription model can also expose various service un-subscription models, such as, for example, Software as a Service ("SaaS"), a web service, Platform as a Service ("PaaS"), and Infrastructure as a Service ("IaaS"). A cloud-computing un-subscription model can also be deployed using different deployment un-subscription models such as private cloud, community cloud, public cloud, hybrid cloud, and so forth. In this description and in the claims, a "cloud-computing environment" is an environment in which cloud computing is employed.

Figure 11:
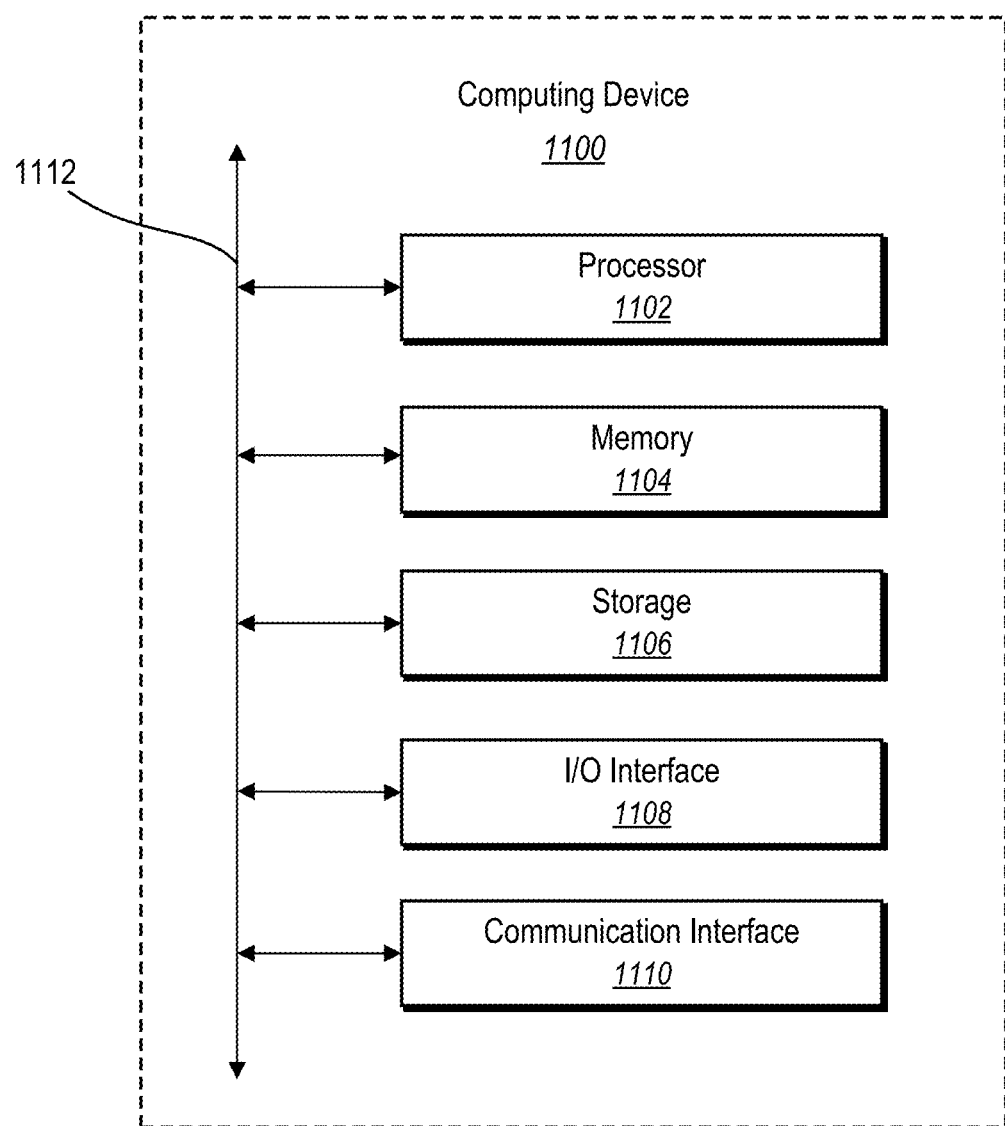
FIG. 11 illustrates a block diagram of an example computing device in accordance with one or more embodiments.

FIG. 11 illustrates a block diagram of exemplary computing device 1100 that may be configured to perform one or more of the processes described above. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example and not by way of limitation, to execute instructions for digitizing real-world objects, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions related to object digitizing processes (e.g., digital scans, digital models).

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may al so facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for digitizing physical objects, a method for generating a three-dimensional model of a scanned object, the method comprising:
    receiving a scan of a three-dimensional object comprising a custom mesh placed on a surface of the three-dimensional object prior to capturing the scan, the scan comprising one or more images of the three-dimensional object and depth information for the three-dimensional object captured during the scan, wherein the custom mesh comprises intersecting custom mesh lines;
    generating, based on the scan of the three-dimensional object, a two-dimensional texture map comprising a representation of the three-dimensional object and the custom mesh thereon;
    generating an edge map from the two-dimensional texture map by detecting edges within the two-dimensional texture map corresponding to the custom mesh lines;
    constructing a two-dimensional mesh of the three-dimensional object by refining the edge map; and
    constructing a three-dimensional mesh of the three-dimensional object from the two-dimensional mesh and the depth information, the three-dimensional mesh comprising three-dimensional edges and vertices corresponding to the custom mesh.

2. The method of claim 1, wherein generating the two-dimensional texture map from the scan comprises aligning the one or more images of the scan.

3. The method of claim 2, wherein generating the two-dimensional texture map from the scan further comprises converting the depth information and the one or more images from a three-dimensional domain to a two-dimensional domain.

4. The method of claim 3, wherein refining the edge map further comprises combining any two or more edge junctions having locations within a threshold distance of each other into a vertex.

5. The method of claim 1, wherein refining the edge map comprising thinning one or more edges of the edge map to have a uniform pixel thickness by iteratively deleting opposing boundary pixels of the one or more edges of the edge map until the one or more edges comprise the uniform pixel thickness.

6. The method of claim 1, wherein the custom mesh lines comprise hand-drawn lines drawn on the surface of the three-dimensional object.

7. The method of claim 1, wherein generating the edge map comprises generating a binary representation of the two-dimensional texture map, the binary representation comprising a first pixel value for any pixels determined to correspond to the custom mesh lines and a second pixel value for other pixels of the two-dimensional texture map.

8. The method of claim 1, further comprising:
    receiving an indication of a color of the custom mesh lines; and
    wherein detecting edges within the two-dimensional texture map comprises identifying pixels of the two-dimensional texture map having pixel values corresponding to the color of the custom mesh lines.

9. A non-transitory computer readable storage medium comprising instructions that, when executed by at least one processor, cause a computing device to:
    receive a scan of a three-dimensional object comprising a custom mesh placed over a surface of the three-dimensional object prior to capturing the scan, the custom mesh comprising intersecting custom mesh lines;
    generate, based on the scan of the three-dimensional object, a two-dimensional texture map comprising a representation of the three-dimensional object and the custom mesh thereon;
    generate an edge map from the two-dimensional texture map by detecting edges within the two-dimensional texture map corresponding to the custom mesh lines;
    construct a two-dimensional mesh of the three-dimensional object by refining the edge map; and
    construct a three-dimensional mesh of the three-dimensional object from the two-dimensional mesh and depth information, the three-dimensional mesh comprising three-dimensional edges and vertices corresponding to the intersecting custom mesh lines.

10. The non-transitory computer readable storage medium of claim 9, wherein the instructions, when executed by the at least one processor, cause the computing device to generate the two-dimensional texture map by combining one or more images of the three-dimensional object from the scan into a composite two-dimensional image based on the depth information for the three-dimensional object.

11. The non-transitory computer readable storage medium of claim 9, wherein refining the edge map comprises adjusting one or more edges corresponding to the custom mesh lines.

12. The non-transitory computer readable storage medium of claim 11, wherein refining the edge map comprises thinning the one or more edges to a uniform thickness.

13. The non-transitory computer readable storage medium of claim 11, wherein refining the edge map comprises replacing curved or bending detected edges between identified junctions of detected edges with straight lines.

14. The non-transitory computer readable storage medium of claim 11, wherein the instructions, when executed by the at least one processor, cause the computing device to construct the two-dimensional mesh by combining junctions at locations within the edge map within a threshold distance of each other.

15. The non-transitory computer readable storage medium of claim 14, wherein the instructions, when executed by the at least one processor, cause the computing device to construct the two-dimensional texture map by further:
   determining that combining the junctions into a vertex would form a polygon having a predetermined number of sides; and
   in response to identifying that the junctions are at locations within the threshold distance of each other and that combining the junctions into a vertex would form a polygon having a predetermined number of sides, removing the edge connecting the junctions and combining the junctions into a single vertex.

16. The non-transitory computer readable storage medium of claim 9, wherein the instructions, when executed by the at least one processor, cause the computing device to construct the two-dimensional mesh by removing any detected edges of the edge map that fail to connect to identified junctions of the edge map.

17. The non-transitory computer readable storage medium of claim 9, wherein the instructions, when executed by the at least one processor, cause the computing device to construct the two-dimensional mesh by removing any detected edges of the edge map having only a single end-point that connect with another detected edge of the edge map.

18. A system comprising:
   a memory device comprising a scan of a three-dimensional object comprising a hand-drawn custom mesh placed over a surface of the three-dimensional object prior to capturing the scan, the scan comprising one or more images of the three-dimensional object and depth information for the three-dimensional object captured during the scan, and the hand-drawn custom mesh comprising intersecting hand-drawn custom mesh lines; and
   at least one computing device configured to cause the system to:
   generate, based on the scan of the three-dimensional object, a two-dimensional texture map comprising a representation of the three-dimensional object and the hand-drawn custom mesh thereon;
   generate an edge map from the two-dimensional texture map by detecting edges within the two-dimensional texture map corresponding to the hand-drawn custom mesh lines;
   construct a two-dimensional mesh of the three-dimensional object by refining the edge map; and
   construct a three-dimensional mesh of the three-dimensional object from the two-dimensional mesh and the depth information, the three-dimensional mesh comprising three-dimensional edges and vertices corresponding to the intersecting hand-drawn custom mesh lines.

19. The system of claim 18, wherein the at least one computing device is configured to refine the edge map by adjusting edges of the edge map with irregularities due to the hand-drawn custom mesh lines.

20. The system of claim 19, wherein adjusting the edges of the edge map with irregularities due to the hand-drawn custom mesh lines comprises:
   generating a thinned edge map by thinning any edges thicker than a uniform edge thickness to the uniform edge thickness;
   identifying junctions of the thinned edge map; and
   replacing curved or bending detected edges between identified junctions with straight lines.

* * * * *